United States Patent Office
3,079,854
Patented Mar. 5, 1963

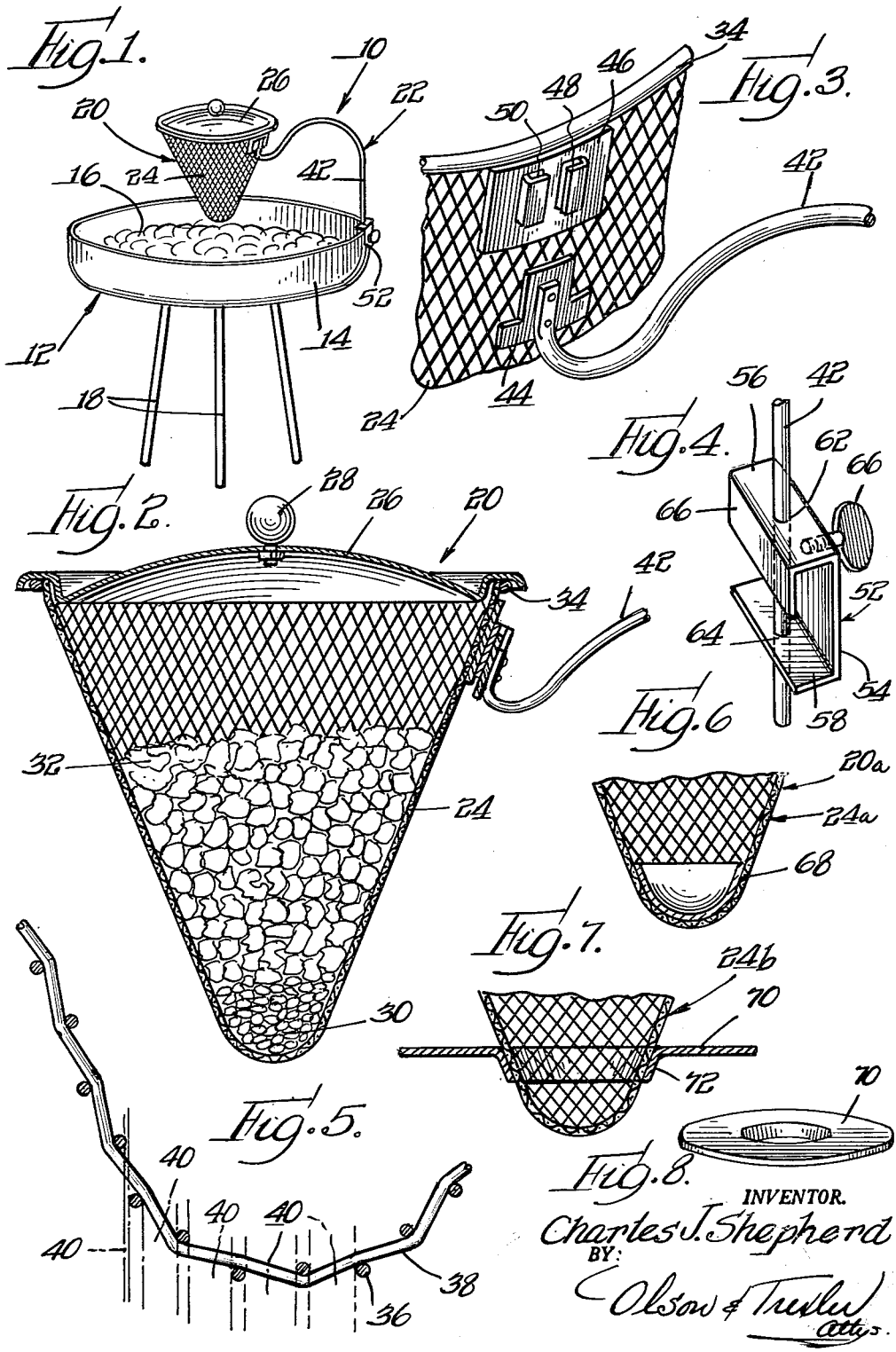

3,079,854
POPCORN POPPER
Charles J. Shepherd, Hometown, Ill.
(20734 S. Greenwood Drive, Olympia Fields, Ill.)
Filed Apr. 28, 1960, Ser. No. 25,287
2 Claims. (Cl. 99—238.1)

The present invention relates to a novel food preparation utensil and more specifically to a novel popcorn popper.

While popcorn popper structures are of the type contemplated herein may utilize various heat sources, they are especially suitable for use in association with charcoal grills and will be described herein with emphasis on such use so as to facilitate the disclosure. Numerous attempts have been made to provide a popcorn popper structure suitable for use with charcoal grills and the like. In general, such prior efforts have met with failure for one or more reasons. For example, in certain proposals the corn after being popped is exposed to too much heat so that it may be burned. In other proposals the possibility of burning may be reduced, but the corn is not heated enough to assure rapid and generally uniform popping.

It is an important object of the present invention to provide a novel popcorn popper structure particularly suitable for use in association with a charcoal grill or other fire heat source and constructed so as to promote rapid and uniform popping of the corn and also so as to minimize any possibility of burning of the popped corn.

A further important object of the present invention is to provide a novel popcorn popping structure which may be mounted on a charcoal grill or suitable support and which is adapted to agitate the corn during a popping operation without any need for manual manipulation.

A further important object of the present invention is to provide a novel popcorn popper which is constructed for presenting unpopped kernels relatively directly to the heat source to promote rapid heating and popping thereof which structure is also adapted to direct popped corn away from the heat source so as to minimize any possibility of burning thereof.

Still another object of the present invention is to provide a novel popcorn popping structure which is constructed so that unpopped kernels are relatively directly exposed to a heat source while popped kernels are relatively shielded and insulated from the heat source whereby rapid popping of the kernels is prompted and any possibility of burning of the popped corn is minimized.

Still another object of the present invention is to provide a novel popcorn popping structure of the above described type which may be selectively adapted for popping the corn either with or without the use of oil and the like.

A more specific object of the present invention is to provide a popcorn popper of the above described type which is of simple and rugged construction.

A further specific object of the present invention is to provide a novel popcorn popper structure of the above described type which may be easily cleaned and maintained.

Other objects of the present invention will become apparent from the following description and the accompanying drawings wherein:

FIG. 1 is a perspective view showing a popcorn popper incorporating features of the present invention mounted on a charcoal grill;

FIG. 2 is an enlarged fragmentary vertical sectional view of the popcorn popper structure shown in FIG. 1;

FIG. 3 is a further enlarged fragmentary exploded perspective view showing a portion of the structure in further detail;

FIG. 4 is a fragmentary perspective view showing a portion of the structure for securing the popper to a grill or other support in greater detail;

FIG. 5 is a further enlarged fragmentary sectional view showing details of a lower portion of a basket member of the popper;

FIG. 6 is a fragmentary sectional view showing a slightly modified form of the present invention;

FIG. 7 is a fragmentary sectional view showing another embodiment of the present invention; and FIG. 8 is a perspective view showing an element of the structure shown in FIG. 7.

Referring now more specifically to the drawings wherein like parts are designated by the same numerals throughout the various figures, a popcorn popper 10 incorporating features of the present invention is shown in FIG. 1 mounted on a charcoal grill 12. The grill 12 may be of any known construction and usually includes a bowl or container 14 having a circular or any other desired configuration and in which charcoal 16 or other fuel may be burned. Any suitable means such as legs 18 are provided for supporting the bowl.

The popcorn popper 10 comprises a container 20 for the popcorn and support means 22 for mounting the container 20 on the bowl 14 of the grill, or any other suitable base.

As shown best in FIGS. 2 and 5, the container portion 20 of the popcorn popper comprises a perforated basket 24 and a lid member 26 therefor. A handle member 28 of heat insulating material is secured to the lid member. While it will be appreciated that the basket member 24 may be formed from various suitable materials, it is preferably formed from screening or wire cloth. By way of example only it may be stated that 10 mesh, 30 gauge wire cloth has been found to be particularly suitable. Preferably the wire cloth is nickel plated or the like, so as to facilitate washing and cleaning and to minimize any possibility of rusting.

In accordance with an important feature of the present invention it is to be noted that the basket member 24 is formed so that it has a relatively small lower end portion for confining kernels 30 of unpopped corn, as indicated in FIG. 2, and side walls which diverge upwardly from the lower end portion for providing an enlarged chamber for receiving popped corn 32, also as indicated in FIG. 2. Preferably the basket member is provided with a substantially inverted frusto-conical configuration for facilitating uniform heating and processing of the corn in the manner described more in detail below. This configuration also simplifies production of the basket member and provides a rounded or cornerless construction which facilitates cleaning. Preferably an upper margin of the basket member is welded or otherwise fixed to a relatively heavy gauge annular re-enforcing wire 34.

As indicated above, the construction of the basket member 24 is such as to promote rapid heating of unpopped kernels 30 at the lower end of the basket member while reducing any possibility of overheating and burning of the popped corn 32. More specifically, it will be noted that, as shown best in FIG. 5, the wire cloth is formed from crossed wires 36 and 38 which define apertures or openings 40 therebetween. The extreme lower end portion of the basket member is formed so that the wire cloth extends substantially transversely of the vertical axis of the basket member or, in other words, this portion of the wire cloth has its outer surface facing the heat source most directly so that the openings 40 therein are substantially fully exposed to the heat source, as indicated by the spacing of the lines in FIG. 5 which show the effective widths of the various openings 40. At the same time the effective widths of the openings 40 of the portions of the wire cloth forming the sharply inclined sides of the basket member are greatly reduced.

As a result, the unpopped kernels 30 in the lower end of the basket may be subjected to a relatively high and rapid heating action since there is a greater substantially direct exposure to the heat source through the effectively wider openings 40 in the lower end of the basket, and the sharply inclined side portions of the basket which present openings which are in effect relatively small or substantially closed, serve to deflect a greater portion of the heat received from the fire whereby the popped corn 32 is insulated from such deflected heat and any possibility of burning is minimized.

The sharply inclined and diverging side portions of the basket member not only tend to shield and insulate the popped corn from the heat source or fire as indicated above, but they also cause the popped corn to rise to a greater height above the heat source further to aid in reducing the heat to which the popped corn is subjected and thereby reducing any possibility of burning. As a result of the inclination of the side portions, which inclination is obtained by forming the frusto-conical basket member with an included angle which preferably approaches about 45°, corn which has been popped rapidly fills the relatively small lower end of the basket member so that the popped kernels are relatively quickly pushed upwardly toward the larger end of the basket and at the same time to a greater height above the heat source. Furthermore the force of the explosions of the popping corn tends to agitate the unpopped kernels which, being considerably smaller and smoother than the popped corn, tend to gravitate to the lowest point in the basket member and thereby slide beneath any popped kernel so that substantially all of the popped kernels are forced upwardly either as a result of their own explosion or of the action of the unpopped kernels.

The support means 22 comprises a wire arm or standard 42 having a suitable fitting 44 secured to an upper end thereof and adapted to enter the socket member 46 secured to a side of the basket member 24. In the embodiment shown, the fitting 44 is in the form of a simple and economical inverted T-shaped sheet metal member welded to the end of the arm 42. The socket member 46 is also formed of sheet metal and is welded to the side of the basket member adjacent the upper margin of the basket. Flange elements 48 and 50 are struck outwardly from the body of the socket member, which flanges have portions extending laterally outwardly and then toward each other for defining a socket adapted to accommodate the upwardly extending stem portion of the inverted T-shaped fitting 44.

A bracket member 52 as shown in FIGS. 1 and 4, is provided for securing a lower end portion of the arm 42 to the bowl of the grill, or any other suitable support. The bracket member which may be economically formed from sheet metal includes an upstanding section 54 having flanges 56 and 58 extending generally horizontally from upper and lower margins thereof. The flange 56 terminates in a relatively short downwardly projecting flange 60 which is adapted to be hooked over an edge of the bowl 15 of the grill for connecting the bracket to the grill. Aligned apertures 62 and 64 are formed in the flanges 56 and 58 for slidably receiving a lower end portion of the wire arm or standard 42, and a thumb screw 66 is threaded through a suitable aperture formed in the upstanding section 54 and is adapted to engage the lower end portion of the wire arm 42 to lock releasably the arm in any desired adjusted position. However, the locking action of the screw 66 is such that the arm or standard 42 may be pivoted around the common axis of the apertures 62 and 64 for adjusting or swinging the upper end portion of the arm and the basket member 24 either over the grill during a popping operation or laterally outwardly from the bowl of the grill after all of the corn has been popped.

As shown in FIG. 1 and partly in FIGS. 2 and 3, the wire arm or standard 42 extends upwardly from the bracket 52. The upwardly extending portion of the arm merges with another portion which not only extends laterally but is also curved or arched. While the member 42 is preferably formed from a relatively heavy gauge resilient wire, it may be formed from any suitable resilient or spring material.

A feature of the present invention which it is important to note, is that the arm member 42 described in detail above, provides a resiliently yieldable or spring support for the basket member 24. With this support it has been found that the force of the explosions from the popping corn will cause the basket member to bounce, which bouncing action is promoted by the spring action of the arm 42. In other words, the spring support for the basket member enables the basket member to be automatically agitated in response to the forces produced by the popping corn whereby uniform processing of the corn is further promoted and any possibility of burning is further minimized.

FIG. 6 shows a slight modification of the present invention which is similar to the above described structure as indicated by the application of identical reference numerals with the suffix *a* added to corresponding parts. In this embodiment the basket structure and the support therefor may be identical to the parts previously described and the embodiment differs only in that a small cup 68 is provided for fitting within the lower end portion of the basket member. As will be understood, it is sometimes desired to use oil and the like while popping the corn, and the container or cup 68 is adapted to receive a supply of oil along with a supply of corn to be popped.

Claims 7 and 8 show another modification of the present invention which is similar to the structures described above as indicated by application of identical reference numerals with the suffix *b* added to corresponding parts. This embodiment shows an additional feature which may be added to either of the embodiments described above. More specifically, a baffle member 70 is provided for further shielding the popped corn in the upper portion of the basket member from the heat source. In the embodiment shown, the baffle member 70 is in the form of an annular sheet metal member having an internal flange portion 72 adapted to fit around and to be secured to a lower end portion of the basket member. The member 70 may be permanently secured to the basket member as by welding or merely forced on and thereby removably secured to the basket member.

While the preferred embodiments of the present invention have been shown and described herein, it is obvious that many structural details may be changed without departing from the spirit and scope of the appended claims.

The invention is claimed as follows:

1. A corn popping attachment for a charcoal grill fire bowl having an upstanding marginal flange, said attachment comprising a flexible arm adapted to be mounted on said flange so as to extend upwardly from said flange and inwardly over the fire bowl, means for securing one end of said arm to the flange, an inverted, conical wire cloth container mounted on the opposite end of said arm for receiving kernels of corn to be popped, and a cover mounted over the top of said container whereby exploding corn kernels contact the sides and cover of the container and cause it to move up and down thereby shaking the unpopped kernels to the bottom of the container.

2. In combination a charcoal grill including a fire bowl having an upstanding marginal flange adapted to contain a charcoal fire, a flexible arm extending upwardly from said flange and inwardly over the fire bowl, means mounted on said flange for securing one end of said arm to the flange, an inverted conical wire cloth container mounted on the opposite end of said arm for receiving kernels of corn to be popped, and a cover mounted over the top of said container whereby exploding corn kernels contact the sides and cover of the container and cause it to move up and down thereby shaking the unpopped kernels to the bottom of the container.

References Cited in the file of this patent

UNITED STATES PATENTS

| | | |
|---|---|---|
| 248,698 | Branch | Oct. 25, 1881 |
| 878,918 | Wesner et al. | Feb. 11, 1908 |
| 937,372 | Higgins | Oct. 19, 1909 |
| 1,154,812 | Schultz | Sept. 28, 1915 |
| 2,840,923 | Behrens | July 1, 1958 |

FOREIGN PATENTS

| | | |
|---|---|---|
| 361,576 | Great Britain | Nov. 26, 1931 |